US009050963B2

(12) United States Patent
Dodo et al.

(10) Patent No.: US 9,050,963 B2
(45) Date of Patent: Jun. 9, 2015

(54) CONTROL APPARATUS FOR VEHICULAR POWER TRANSMITTING APPARATUS

(75) Inventors: Kohei Dodo, Miyoshi (JP); Yoichi Nakashima, Toyota (JP); Atsushi Muto, Toyota (JP); Tsuyoshi Fujikane, Toyota (JP); Keigo Matsubara, Nagoya (JP); Junichi Inoue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 13/981,483

(22) PCT Filed: Jan. 16, 2012

(86) PCT No.: PCT/IB2012/000050
§ 371 (c)(1),
(2), (4) Date: Sep. 13, 2013

(87) PCT Pub. No.: WO2012/101491
PCT Pub. Date: Aug. 2, 2012

(65) Prior Publication Data
US 2014/0018209 A1 Jan. 16, 2014

(30) Foreign Application Priority Data
Jan. 26, 2011 (JP) ................................. 2011-014199

(51) Int. Cl.
*B60W 10/02* (2006.01)
*F16D 48/08* (2006.01)
*F16H 61/14* (2006.01)
*B60W 10/06* (2006.01)
*F16H 47/06* (2006.01)
*F16H 59/72* (2006.01)

(52) U.S. Cl.
CPC ............. *B60W 10/02* (2013.01); *Y10T 477/755* (2015.01); *Y10T 477/63385* (2015.01);
(Continued)

(58) Field of Classification Search
CPC ......... F16H 47/06; F16H 61/14; F16D 48/08; B60W 10/02; B60W 10/06; Y10T 477/63385; Y10T 477/653; Y10T 477/735; Y10T 477/75; Y10T 477/753; Y10T 477/755; Y10T 477/78
USPC ............. 477/57, 169, 174, 175, 176, 180, 98; 701/68
See application file for complete search history.

(56) References Cited

U.S. PATENT DOCUMENTS 5,323,320 A * 6/1994 Hathaway et al. .............. 701/67
5,679,091 A 10/1997 Salecker et al.

(Continued)

FOREIGN PATENT DOCUMENTS

DE 41 24 722 A1 1/1993
DE 195 04 935 A1 8/1995

(Continued)

*Primary Examiner* — Roger Pang
(74) *Attorney, Agent, or Firm* — Oliff PLC

(57) ABSTRACT

A map is provided that has an unlimited region where a take-off slip-engagement the next time is repeatedly executed indefinitely, a limited region where the take-off slip-engagement the next time is repeatedly executed only once, and a prohibited region where the take-off slip-engagement the next time is prohibited, and has a generated heat amount during the take-off slip-engagement and an elapsed time after the lock-up slip-engagement ends as variables. Therefore, a region in which the take-off slip-engagement the next time had been prohibited because the take-off slip-engagement the next time is unable to be repeatedly executed indefinitely even though it is able to be repeatedly executed only once is made the limited region, so the take-off slip-engagement the next time is allowed to be repeatedly executed only once.

8 Claims, 6 Drawing Sheets

(52) U.S. Cl.
CPC ............ *Y10T477/653* (2015.01); *F16H 47/06* (2013.01); F16D 48/08 (2013.01); *F16D 2500/30405* (2013.01); *F16D 2500/30406* (2013.01); *F16D 2500/3166* (2013.01); *F16D 2500/50224* (2013.01); *F16D 2500/5106* (2013.01); *F16D 2500/70426* (2013.01); F16H 61/143 (2013.01); *F16H 2059/725* (2013.01); *F16H 2061/145* (2013.01); *F16H 2312/02* (2013.01); B60W 10/06 (2013.01)

(56) References Cited

U.S. PATENT DOCUMENTS

| | | | |
|---|---|---|---|
| 5,954,618 A * | 9/1999 | Mikami et al. | 477/174 |
| 6,113,517 A * | 9/2000 | Salecker et al. | 477/174 |
| 6,152,275 A * | 11/2000 | Fischer et al. | 192/82 T |
| 8,682,554 B2 * | 3/2014 | Takamatsu et al. | 701/68 |
| 2005/0277515 A1 | 12/2005 | Tanaka | |
| 2006/0004506 A1 | 1/2006 | Stehle et al. | |
| 2006/0030457 A1 | 2/2006 | Reibold et al. | |
| 2006/0237275 A1 | 10/2006 | Fujita et al. | |

FOREIGN PATENT DOCUMENTS

| | | |
|---|---|---|
| DE | 10 2005 029 566 A1 | 2/2006 |
| JP | A-2005-351357 | 12/2005 |
| JP | DE10 2004 023 581 A1 | 12/2005 |
| JP | DE10 2005 033 077 A1 | 3/2006 |
| JP | A-2006-226333 | 8/2006 |
| JP | A-2006-300206 | 11/2006 |

* cited by examiner

|  | C1 | C2 | B1 | B2 | B3 | F1 |
|---|---|---|---|---|---|---|
| 1ST | ○ |  |  | ◎ |  | △ |
| 2ND | ○ |  | ○ |  |  |  |
| 3RD | ○ |  |  |  | ○ |  |
| 4TH | ○ | ○ |  |  |  |  |
| 5TH |  | ○ |  |  | ○ |  |
| 6TH |  | ○ | ○ |  |  |  |
| R |  |  |  | ○ | ○ |  |
| N |  |  |  |  |  |  |

◎ OPERATED WHEN ENGINE BRAKE IS APPLIED
△ OPERATED ONLY WHEN DRIVING

CONTROL APPARATUS FOR VEHICULAR POWER TRANSMITTING APPARATUS

INCORPORATION BY REFERENCE

The disclosure of Japanese Patent Application No. 2011-014199 filed on Jan. 26, 2011, including the specification, drawings and abstract is incorporated herein by references in its entirety.

BACKGROUND OF THE INVENTION

1. Field of the Invention

The invention relates to a control apparatus for a vehicular power transmitting apparatus that performs slip control of a friction clutch.

2. Description of the Related Art

A friction clutch that is provided in a power transmitting path between an engine and driving wheels is well known. Examples include friction clutches such as a forward clutch (i.e., a starting clutch or take-off clutch) and lock-up clutch described in Japanese Patent Application Publication No. 2006-226333 (JP-A-2006-226333), Japanese Patent Application Publication No. 2005-351357 (JP-A-2005-351357), and Japanese Patent Application Publication No. 2006-300206 (JP-A-2006-300206). Generally, this kind of a friction clutch has a mechanism that allows friction elements to slip such that rotational difference occurs, and is able to be switch-controlled between a released (i.e., disengaged) state and a completely engaged state, as well as controlled to a slip-engaged state. For example, in a lock-up clutch, it is determined whether the clutch is engaged or released based on the vehicle state from a preset relationship aimed at improving fuel efficiency and the like. Lock-up control is started when the vehicle state enters a lock-up region. Moreover, the lock-up control region is able to be made wider, thus enabling fuel efficiency to be improved, by executing slip control (lock-up slip control, flex lock-up control) that enables lock-up operation over a wide running range by providing predetermined slippage in the lock-up clutch based on the vehicle state from the preset relationship.

Here, the amount of heat generated in the friction elements of the friction clutch, as well as the temperature of the friction elements themselves, increase the more slip control is executed. Therefore, the durability of the friction elements may decrease depending on the manner in which slip control is executed. In particular, slip control at take-off (hereinafter referred to as "take-off slip control"), that prevents the engine from racing, or overspeeding, and thus improves fuel efficiency by slip-engaging the lock-up clutch when the vehicle takes off from a standstill, is control from the time that the vehicle takes off, at which time the slip amount of the lock-up clutch is relatively large. Therefore, the thermal load of the lock-up clutch is large, so heat resistance may become even more of an issue.

Therefore, various methods that estimate the amount of heat generated in the friction elements and execute slip control taking this amount of heat into account have been proposed to deal with this issue of reduced durability of the friction elements. For example, JP-A-2006-226333 proposes to improve fuel efficiency by regarding the hydraulic fluid temperature at the start of control as the temperature of the sliding portions of the lock-up clutch, and setting, based on the hydraulic fluid temperature, each of an allowed cumulative heating value and a allowed slip engagement time until slip control is canceled, and a required restart time until slip control is restarted after it has been canceled, and then canceling slip engagement control according to the allowed slip engagement time and the allowed cumulative heating value, as well as suppressing the slip engagement control from being canceled more than is necessary while preventing the lock-up clutch from overheating, by restarting the slip engagement control according to the required restart time.

The required restart time described in JP-A-2006-226333 is set to the time that it will take for the temperature to fall from a highest allowable temperature to a restart allowed temperature. That is, a time that allows for the worst cooling from the worst state (i.e., a state with the maximum heat value conceivable; the highest conceivable temperature) (that is, the longest period of time assumed for the temperature to fall to the restart allowed temperature) is set. However, slip control is not limited to always being canceled after the worst state is realized when slip control is executed. When the required restart time is set as described above, slip control may be unable to be restarted even in a state in which slip control would normally be able to be restarted. In this case, slip control is executed less frequently, so there may be fewer opportunities to benefit from the effects of executing slip control. This issue is not well-known, and there is room for further improvement to simultaneously suppress a decrease in the durability of the friction clutch and better obtain the effects from executing slip control.

SUMMARY OF THE INVENTION

In view of the situation described above, the invention provides a control apparatus for a vehicular power transmitting apparatus that is capable of increasing, as much as possible, the number of opportunities to execute slip control while suppressing a decrease in durability of a friction clutch.

Therefore, a first aspect of the invention relates to a control apparatus for a vehicular power transmitting apparatus that is provided with a friction clutch in a power transmitting path between an engine and a driving wheel. The control apparatus performs slip control that slip-engages the friction clutch, in which a predetermined relationship is provided that has an unlimited range where slip control a next time is repeatedly executed indefinitely, a limited range where slip control the next time is repeatedly executed only a predetermined number of times, and a prohibited range where slip control the next time is prohibited, and that has a generated heat amount in the friction clutch during the slip control and an elapsed time after the slip control ends as variables.

As described above, a predetermined relationship is provided that has an unlimited range where slip control a next time is repeatedly executed indefinitely, a limited range where slip control the next time is repeatedly executed only a predetermined number of times, and a prohibited range where slip control the next time is prohibited, and that has a generated heat amount in the friction clutch during the slip control and an elapsed time after the slip control ends as variables. Therefore, by executing take-off slip control according to this predetermined relationship, the region in which take-off slip control the next time had been prohibited because take-off slip control the next time is unable to be executed repeatedly indefinitely, but is able to be repeatedly executed only a predetermined number of times, is made the limited region, such that take-off slip control the next time is allowed to be repeatedly, executed only a predetermined number of times. As a result, the number of opportunities to execute take-off slip control can be increased as much as possible while suppressing a decrease in the durability of the friction clutch. Here, a map or an expression in which the unlimited range, the limited range, and the prohibited range are indicated, with the generated heat amount in the friction clutch during the slip control and the elapsed time after the slip control ends as variables may be provided.

Also, in the control apparatus described above, the slip control may be executed with the generated heat amount in one time of control having a predetermined maximum generated heat amount that is set in advance as an upper limit, and allowing the slip control the next time may be allowing slip control until the predetermined maximum generated heat amount for one time of control is reached. Accordingly, a decrease in the durability of the friction clutch due to the slip control that has been allowed to be repeatedly executed actually being executed is able to be reliably suppressed.

Also, in the control apparatus described above, a range from among the prohibited range, the limited range, and the unlimited range may be obtained based on the generated heat amount during the slip control and the elapsed time after the slip control ends, from the predetermined relationship. Accordingly, slip control is able to be appropriately executed according to the predetermined relationship.

Also, in the control apparatus described above, the predetermined relationship may be set such that as the generated heat amount during the slip control decreases, the limited range is obtained more easily than the prohibited range and the unlimited range is obtained more easily than the limited range, and as the elapsed time after the slip control ends becomes longer, the limited range is obtained more easily than the prohibited range and the unlimited range is obtained more easily than the limited range. Accordingly, slip control is able to be even more appropriately executed according to the predetermined relationship.

Also, in the control apparatus described above, the friction clutch may be a lock-up clutch capable of directly connecting together input/output rotating members of a fluid power transmitting device that transmits power of the engine to the driving wheel side, and the slip control may be lock-up slip control that slip-engages the lock-up clutch when a vehicle is running. Accordingly, the number of opportunities to execute lock-up slip control can be increased as much as possible while suppressing a decrease in the durability of the lock-up clutch. Thus, fuel efficiency can be improved.

Also, in the control apparatus described above, the lock-up slip control may be take-off lock-up slip control that slip-engages the lock-up clutch such that a speed of the engine comes to match a target value when the vehicle takes off. Therefore, the number of opportunities to execute take-off slip control can be increased as much as possible while suppressing a decrease in the durability of the lock-up clutch, to combat the fact that repeated execution of take-off slip control may not be easily allowed due to the generated heat amount becoming relatively large when take-off slip control is executed.

BRIEF DESCRIPTION OF THE DRAWINGS

Features, advantages, and technical and industrial significance of exemplary embodiments of this invention will be described in the following detailed description of example embodiments of the invention with reference to the accompanying drawings, in which like numerals denote like elements, and wherein.

DETAILED DESCRIPTION OF EMBODIMENTS

Figure 1:
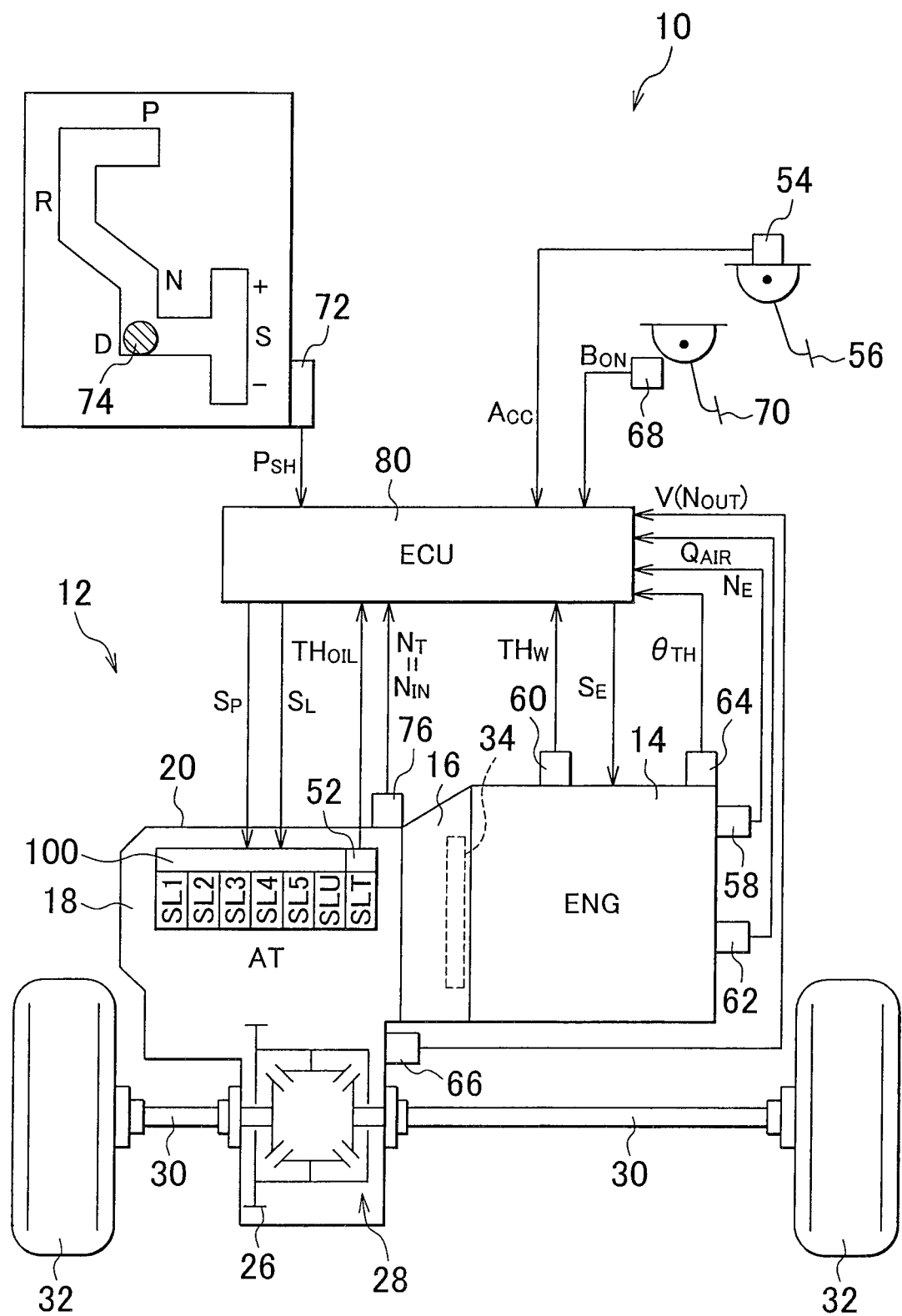
FIG. 1 is a diagram of the general structure of a power transmitting path provided in a vehicle to which the control apparatus for a vehicular power transmitting apparatus according to one example embodiment of the invention is applied, that also shows the main portions of a control system provided in the vehicle.

In the invention, a diesel engine or a gasoline engine or the like, such as an internal combustion engine that generates power by burning fuel, for example, is preferably used as the engine, but another prime mover such as an electric motor may also be used in combination with an engine.

Also, the vehicular power transmitting apparatus may include a transmission in a power transmitting path between the engine and the driving wheels. This transmission may be formed by, for example, i) any one of various planetary gear automatic transmissions that have, for example, four, five, six, or more forward speeds, in which a plurality of gear speeds (i.e., speeds) are alternatively established by selectively connecting rotating elements of a plurality of planetary gear sets together by an engagement apparatus, ii) a synchronous mesh twin shaft parallel axis-type automatic transmission that is a synchronous mesh twin shaft parallel axis-type transmission provided with a plurality of sets of transmission gears that are constantly in mesh provided between two shafts, that alternatively places one of these plurality of sets of transmission gears in a power transmitting state by a synchronizer, but that is able to automatically switch speeds using a synchronizer that is driven by a hydraulic actuator, iii) a so-called DCT (Dual Clutch Transmission) that is a type of transmission that is a synchronous mesh twin shaft parallel axis-type automatic transmission that has two systems of input shafts and is structured such that a clutch connected to the input shaft of each system, with one being linked to the even speeds and the other being linked to the odd speeds, iv) a co-called belt-type continuously variable transmission in which a drive belt that functions as a power transmitting member is wound around a pair of variable pulleys with variable effective diameters, and a speed ratio is continuously changed in a stepless manner, or v) a so-called traction type continuously variable transmission structured such that a plurality of individual rollers in which the rotational centers that intersect the axis of a pair of cones that rotate about a common axis are able to be pivoted are pressed between the pair of cones, in which the speed ratio is varied by changing the angle of intersection between the rotational centers of the rollers and the axis of the pair of cones.

Also, the friction clutch may be an engagement apparatus provided in the planetary gear automatic transmission, the clutches that are connected to the input shafts of the synchronous mesh twin shaft parallel axis-type automatic transmission (including the DCT), or an engagement apparatus that forms a forward-reverse switching apparatus of the continuously variable transmission, or the like. Also, the slip control of this kind of friction clutch is so-called neutral control (N control) that places the friction clutch in a slip state so as to place a power transmitting path from the engine to the driving wheels in a power transmission inhibited state in order to improve fuel efficiency, when the vehicle is stopped in an "R" or a "D" position, that are well known positions, for example.

Also, a hydraulic frictional engagement apparatus such as a multiple or single disc clutch or brake or the like that is engaged by a hydraulic actuator is widely used as an engagement apparatus provided in the planetary gear automatic transmission or as an engagement apparatus that forms the forward-reverse switching apparatus of a continuously variable transmission. An oil pump that supplies hydraulic fluid for engaging this hydraulic frictional engagement apparatus may be configured to discharge oil by being driven by a driving source for running, or it may be driven by a dedicated electric motor or the like provided separately from the driving source, for example. Further, in terms of responsiveness, the hydraulic control circuit that includes this hydraulic frictional engagement apparatus preferably supplies the output pressure from a linear solenoid valve that serves as an electromagnetic valve device, for example, directly to the hydraulic actuator (hydraulic cylinder) of the hydraulic frictional engagement apparatus. However, the hydraulic control circuit may also be configured to control a shift control valve by using the output pressure from this linear solenoid valve as the pilot pressure, and supply hydraulic fluid from this control valve to the hydraulic actuator. Also, various modes are possible. For example, one of the linear solenoid valves may be provided for each of a plurality of hydraulic frictional engagement apparatuses, but when there are a plurality of hydraulic frictional engagement apparatuses that are engaged simultaneously or that are not controlled to engage and release, a common linear solenoid valve may also be provided for these. Also, hydraulic control of all of the hydraulic frictional engagement apparatuses does not necessarily have to be performed by a linear solenoid valve. That is, hydraulic control of a portion or all of the hydraulic frictional engagement apparatuses may also be performed by a pressure regulating device other than a linear solenoid valve, such as by duty control of an ON-OFF solenoid valve or the like. The phrase "supplying hydraulic pressure" in this specification means "applying hydraulic pressure" or "supplying hydraulic fluid controlled to that hydraulic pressure."

Figures 2, 3:
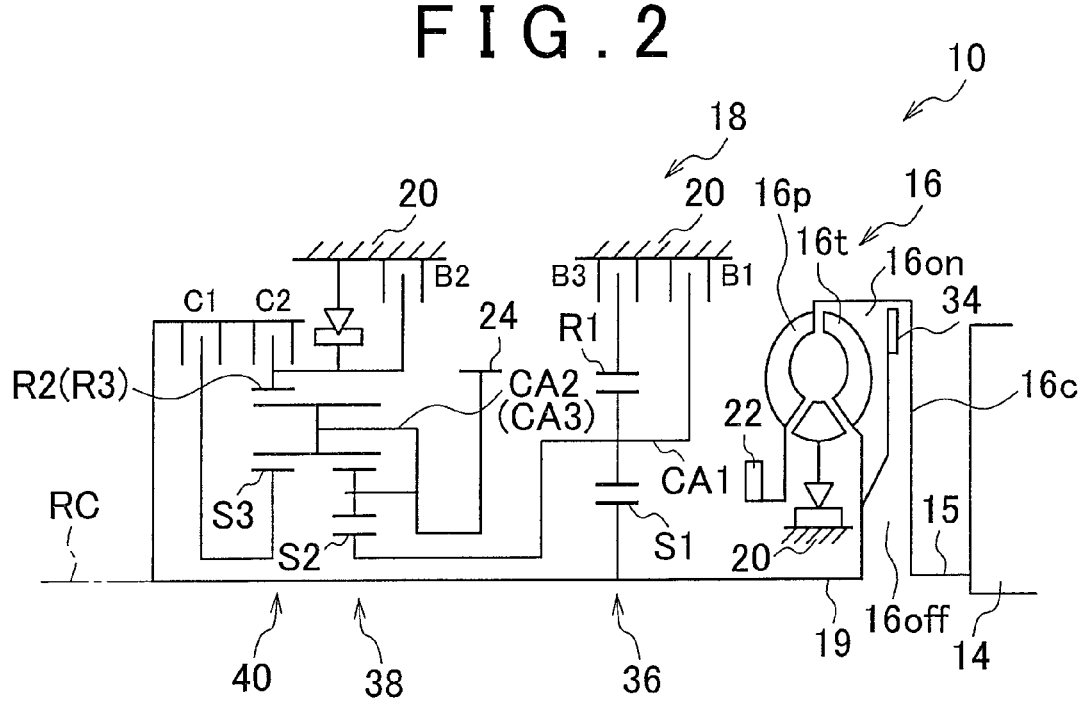
FIG. 2 is a skeleton view of the structure of an automatic transmission and the like to which the control apparatus of the example embodiment is applied.
FIG. 3 is a clutch and brake application chart illustrating the relationship between shift operations of the automatic transmission to which the control apparatus of this example embodiment is applied and combinations of operations of engagement apparatuses used in those operations.

Hereinafter, a control apparatus 12 of the example embodiment of the invention will be described in detail with reference to the drawings. FIG. 1 is a diagram of the general structure of a power transmitting path from an engine 14 provided in a vehicle 10, to which the invention is applied, to driving wheels 32, that also shows the main portions of a control system provided in the vehicle 10 for performing output control of the engine 14 and shift control of an automatic transmission 18, and the like. Also, FIG. 2 is a skeleton view of the automatic transmission 18 and the like. A torque converter 16 and the automatic transmission 18 have generally symmetrical structures with respect to a center line (i.e., an axial center RC), so in FIG. 2, the half below the center line is omitted. Also, the axial center RC in FIG. 2 is the rotational center of the engine 14 and the torque converter 16.

In FIGS. 1 and 2, a vehicular power transmitting apparatus 12 (hereinafter, simply referred to as the "power transmitting apparatus 12") includes, in order from the engine 14 side, the torque converter 16 and the automatic transmission 18 and the like on the axial center RC inside a transaxle case 20 (hereinafter, simply referred to as the "case 20") that serves as a non-rotating member attached by bolts or the like to a vehicle body. Also, the power transmitting apparatus 12 includes a differential ring gear 26 that is in mesh with an output gear 24 that serves as an output rotating member of the automatic transmission 18, a differential gear unit (i.e., a differential gear) 28 integrally provided with the differential ring gear 26, and a pair of axles 30 that are connected to this differential gear unit 28, and the like. The power transmitting apparatus 12 structured in this way may be used in the vehicle 10 that is an FF (Front engine-Front drive) type vehicle, for example. In the power transmitting apparatus 12, the power of the engine 14 is transmitted from a crankshaft 15 to, the pair of driving wheels 32 via the torque converter 16, the automatic transmission 18, the differential ring gear 26, the differential gear unit 28, and the pair of axles 30 and the like, in this order.

The torque converter 16 is a fluid power transmitting device that transmits power between a pump impeller $16p$ and a turbine runner $16t$ via fluid. The pump impeller $16p$ is coupled to the engine 14 via the crankshaft 15, and is an input side rotating element of the torque converter 16 that receives driving force from the engine 14 and is able to rotate about the axial center RC. Also, the turbine runner $16t$ is an output side rotating element of the torque converter 16, and is coupled to an input shaft 19 that serves as an input rotating member of the automatic transmission 18 via spline engagement or the like, in a manner such that the turbine runner $16t$ is unable to rotate relative to the input shaft 19. Also, a lock-up clutch 34 that is able to directly connect (i.e., lock up) the pump impeller $16p$ with the turbine runner $16t$, i.e., the input/output rotating members of the torque converter 16, is provided between the pump impeller $16p$ and the turbine runner $16t$. Further, a mechanical oil pump 22 for generating hydraulic pressure that is to become the base pressure for controlling shifting in the automatic transmission 18, controlling the operation of the lock-up clutch 34, or supplying lubricating oil to various parts, is connected to the pump impeller $16p$. This mechanical oil pump 22 generates hydraulic pressure by being rotatably driven by the engine 14.

The lock-up clutch 34 is a hydraulic friction clutch that has mechanism that slides friction elements to create rotational difference, and friction-engages with a front cover $16c$ in response to a differential pressure $\Delta P$ ($=P_{ON}-P_{OFF}$) between hydraulic pressure $P_{ON}$ inside an engage-side fluid chamber 16 on and hydraulic pressure $P_{OFF}$ inside a release-side fluid chamber 16 off being controlled a hydraulic control circuit 100 (see FIG. 4), as is well known. There are, for example, three main operating states of the torque converter 16. These three states are i) a so-called lock-up released (i.e., a lock-up off) state in which the differential pressure $\Delta P$ is equal to or less than zero and the lock-up clutch 34 is released, ii) a so-called lock-up slip state (i.e., a slip state) in which the differential pressure ΔP is greater than zero and the lock-up clutch 34 is partially engaged as it slips, and iii) a so-called locked-up state (i.e., an engaged state or a lock-up on state) in which the differential pressure ΔP is the maximum value and the lock-up clutch 34 is completely engaged. For example, when the lock-up clutch 34 is completely engaged (i.e., in the lock-up on state), the pump impeller 16p and the turbine runner 16t are made to rotate together and power from the engine 14 is directly transmitted to the automatic transmission 18 side. Also, lock-up slip control that causes the turbine shaft to rotate following the crankshaft 15 with a predetermined amount of slip when the vehicle 10 is in a driving state (i.e., in a power-on state), and causes the crankshaft 15 to rotate following the turbine shaft with a predetermined amount of slip when the vehicle 10 is in a non-driving state (i.e., in a power-off state), is performed by the differential pressure ΔP being controlled to slip-engage the lock-up clutch 34 in a predetermined slip state, e.g., by the input/output rotation speed difference (slip rotation speed (i.e., slip amount)=engine speed $N_E$–turbine rotation speed $N_T$) $N_S$ being feedback controlled when the vehicle 10 is in a driving state (i.e., in the power-on state). The slip state of the lock-up clutch 34 eliminates the torque load of the lock-up clutch 34 by the differential pressure ΔP being zero, for example, so the operating condition of the torque converter 16 is the same as it is when the torque converter 16 is in the lock-up off state.

The automatic transmission 18 forms a portion of the power transmitting path from the engine 14 to the driving wheels 32, and is a planetary gear type multiple speed transmission that functions as a stepped automatic transmission in which a shift is executed by changing over some of the plurality of hydraulic frictional engagement apparatuses (i.e., by engaging and releasing hydraulic frictional engagement apparatuses) such that a plurality of speeds (i.e., gear speeds) are selectively established. For example, the automatic transmission 18 is a well-known stepped transmission that performs a so-called clutch-to-clutch shift and is often used in vehicles. The automatic transmission 18 has a single-pinion type first planetary gear set 36, a double-pinion type second planetary gear set 38 of a Ravigneaux type configuration, and a single-pinion type third planetary gear set 40 all on the same axis (i.e., on the axial center RC). The automatic transmission 18 uses these planetary gear sets to appropriately change the rotation speed or direction of rotation that is input from the input shaft 19 and outputs the changed rotation or direction of rotation from the output gear 24.

More specifically, portions of rotating elements (i.e., sun gears S1 to S3, carriers CA1 to CA3, and ring gears R1 to R3) of the first planetary gear set 36, the second planetary gear set 38, and the third planetary gear set 40 are coupled to each other either directly, or indirectly or selectively via hydraulic frictional engagement apparatuses (i.e., the clutches C1 and C2, and the brakes B1, B2, and B3) or a one-way clutch F1, or are connected to the input shaft 19, the case 20, or the output gear 24.

Each speed (i.e., gear speed) of six forward speeds and one reverse speed is established as shown in the clutch and brake application chart in FIG. 3 according to an accelerator operation by the driver and the vehicle speed V and the like, by engagement/release control of the clutches C1 and C2 and the brakes B1, B2, and B3. "1ST" to "6TH" in FIG. 3 indicate the six forward gear speeds of first speed to sixth speed, "R" indicates a reverse gear speed, and "N" indicates a neutral state in which no gear speed is established. The clutch and brake application chart in FIG. 3 summarizes the relationships between each gear speed and the operating states of the clutches C1 and C2 and the brakes B1, B2, and B3. A single circle indicates engagement, a double circle indicates engagement only when the engine brake is applied, and the absence of a symbol indicates release. The one-way clutch F1 is provided in parallel with the brake B2 that is used to establish first speed "1ST", so it is not always necessary to engage the brake B2 when taking off from a standstill (when accelerating). That is, when taking off from a standstill, it is sufficient to engage only the clutch C1. For example, this clutch C1 is engaged when returning from well-known neutral control. In this way, the clutch C1 functions as a starting clutch (also referred to as a "take-off clutch"). Also, the speed ratio γ(=the input shaft rotation speed $N_{IN}$ of the input shaft 19/the output shaft rotation speed $N_{OUT}$ of the output gear 24) of the automatic transmission 18 corresponding to each gear speed is set appropriately according to each gear ratio (=the number of teeth on the sun gear/the number of teeth on the ring gear) of the first planetary gear set 36, the second planetary gear set 38, and the third planetary gear set 40.

The clutches C1 and C2 and the brakes B1, B2, and B3 (hereinafter, simply referred to as the clutches C and the brakes B, or the engagement apparatuses, when not it is not particularly necessary to differentiate between them) are hydraulic friction clutches that are well-known and often used in vehicular automatic transmissions, and are formed by wet type multiple disc clutches and brakes that are pressed on by hydraulic actuators, or band brakes that are pulled tight by hydraulic actuators, or the like. The clutches C and brakes B structured in this way are each switched between being engaged and being released, and the transition engaging pressure and the like during engagement and release is controlled, by for example continuously (i.e., smoothly) changing the torque capacity, i.e., the engaging force of each, which is accomplished by current control or energizing and de-energizing linear solenoid valves SL1 to SL5 and the like in the hydraulic control circuit 100. The torque capacity of the engagement apparatuses is determined by the engaging pressure pressing on the friction plates or by the friction coefficient of the friction members in the engagement apparatuses, for example. In order to transmit the vehicle required torque (such as the transmission input torque TAT or the like) without the engagement apparatuses slipping, the torque capacity must be equal to or greater than the load torque of the engagement apparatuses with respect to the vehicle required torque. Also, in this example embodiment, the engaging pressure and the torque capacity of the engagement apparatuses may be used synonymously for the sake of convenience.

Returning now to FIG. 1, the vehicle 10 is provided with an electronic control unit (ECU) 80 that includes a control device that performs lock-up slip control (i.e., slip control) that slip-engages the lock-up clutch 34 when the vehicle is running, for example. This ECU 80 includes, for example, a so-called microcomputer that includes a CPU, RAM, ROM, and an input/output interface and the like. The CPU executes various controls of the vehicle 10 by processing signals according to programs stored in the ROM beforehand, while using the temporary storage function of the RAM. For example, the ECU 80 is configured to execute output control of the engine 14, shift control of the automatic transmission 18, and torque capacity control of the lock-up clutch 34, and the like. When necessary, the ECU 80 may be formed divided into an engine control device for engine control, a hydraulic control device for shift control of the automatic transmission 18, and a hydraulic control device for hydraulic control of the lock-up clutch 34, and the like.

The ECU 80' receives various signals, such as a signal indicative of a turbine rotation speed $N_T$ (i.e., the input shaft rotation speed $N_{IN}$ that is the rotation speed of the input shaft 19) that is the rotation speed of the turbine shaft of the torque converter 16 detected by a turbine rotation speed sensor 50, a signal indicative of a hydraulic fluid temperature $TH_{oil}$ that is the temperature of hydraulic fluid (such as ATF that is well known) in the hydraulic control circuit 100 detected by a hydraulic fluid temperature sensor 52, a signal indicative of an accelerator operation amount Acc that is the operation amount of an accelerator pedal 56 that serves as the amount of acceleration required (i.e., the required acceleration amount) by the driver for the vehicle 10 (i.e., a driver required amount), that is detected by an accelerator operation amount sensor 54, and a signal indicative of the engine speed $N_E$ that is the speed of the engine 14 detected by an engine speed sensor 58. The ECU 80 also receives other signals such as a signal indicative of a coolant temperature $TH_W$ of the engine 14 detected by a coolant temperature sensor 60, a signal indicative of an intake air amount $Q_{AIR}$ of the engine 14 detected by an intake air amount sensor 62, a signal indicative of a throttle valve opening amount $\theta_{TH}$ that is the opening amount of an electronic throttle valve detected by a throttle valve opening amount sensor 64, a signal indicative of an output rotation speed $N_{OUT}$ that is the rotation speed of the output gear 24 corresponding to the vehicle speed V detected by a vehicle speed sensor 66, a signal indicative of an operation (a brake-on state) $B_{ON}$ of a foot brake pedal 70 indicating that a foot brake that serves as the service brake is being operated (i.e., being depressed), that is detected by a brake switch 68, and a signal indicative of a lever position (i.e., an operating position or a shift position) $P_{SH}$ of a shift lever 74 that is detected by a lever position sensor 72.

The ECU 80 also outputs various signals as engine output control command signals $S_E$ for controlling the output of the engine 14, for example. Some examples of these signals include a drive signal to a throttle actuator for controlling the opening and closing of the electronic throttle valve according to the accelerator operation amount Acc, an injection signal for controlling a fuel injection quantity of fuel that is injected from a fuel injection apparatus, and an ignition timing signal for controlling the ignition timing of the engine 14 by an igniter, and the like. In addition, the ECU 80 also outputs various signals to the hydraulic control circuit 100, as pressure control command signals $S_P$ for controlling shifting in the automatic transmission 18, for example. Some examples of these signals include value command signals (i.e., pressure command signals, pressure command values, drive signals) for controlling the energizing and de-energizing and the like of the linear solenoid valves SL1 to SL5 in the hydraulic control circuit 100 in order to shift speeds in the automatic transmission 18, and a pressure command signal for a linear solenoid valve SLT in order to control or regulate a first line pressure PL1 and a second line pressure PL2, and the like. Moreover, the ECU 80 also outputs various signals to the hydraulic control circuit 100, as lock-up control command signals $S_L$ for controlling engagement, release, and the slip amount $N_S(=N_E-N_T)$ of the lock-up clutch 34, for example. Examples of these signals include pressure command signals for driving a linear solenoid valve SLU and a solenoid valve SL (see FIG. 4) provided in the hydraulic control circuit 100.

Figure 4:
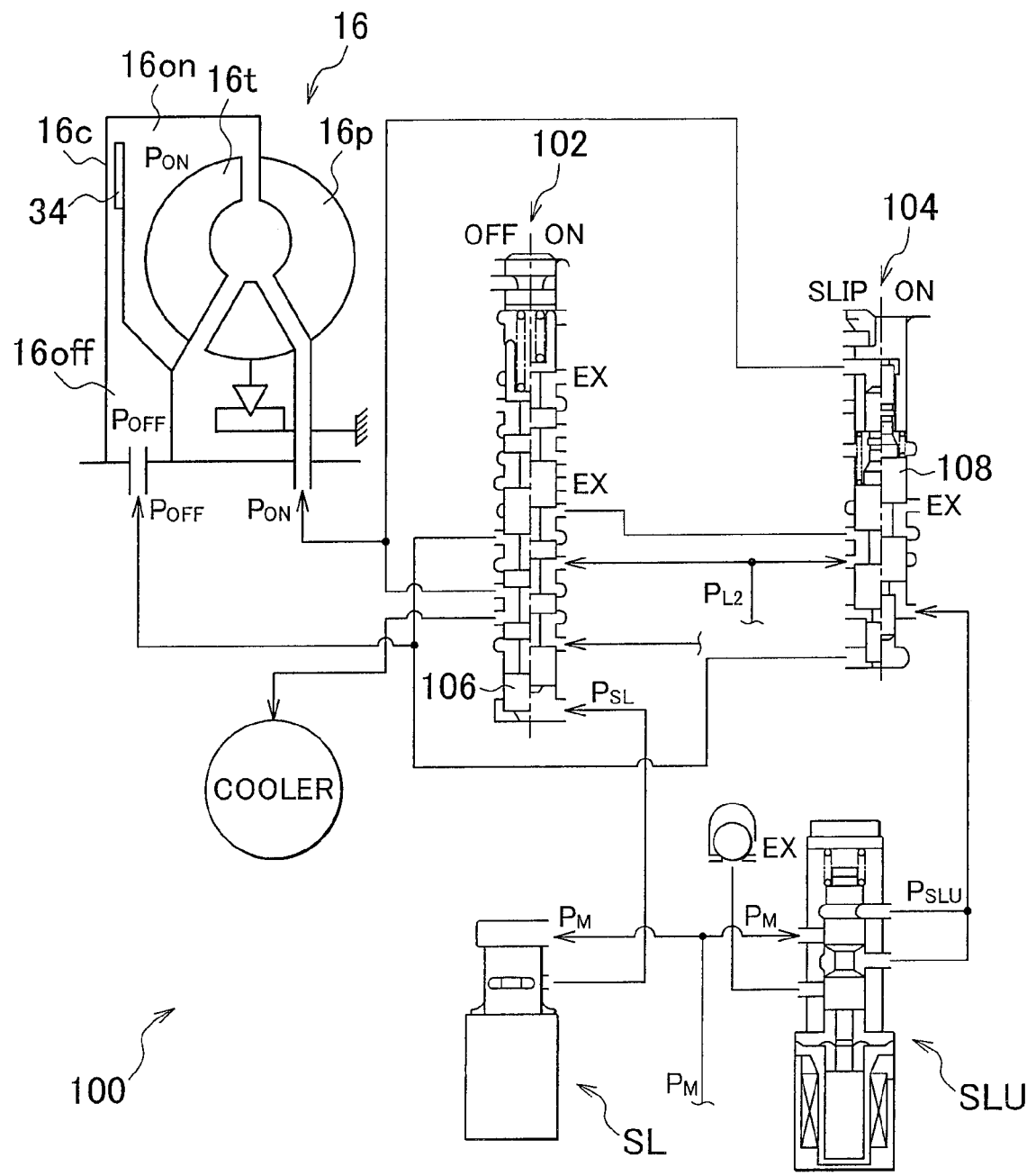
FIG. 4 is a circuit diagram related to operation control and the like of a lock-up clutch, in a hydraulic control circuit of the automatic transmission to which the control apparatus of the example embodiment is applied.

FIG. 4 is a diagram of the main portions of a hydraulic control circuit related to operational control and the like of the lock-up clutch 34 in the hydraulic control circuit 100. In FIG. 4, the hydraulic control circuit 100 includes a switching solenoid valve SL, a lock-up relay valve 102, a slip control linear solenoid valve SLU, and a lock-up control valve 104. The switching solenoid valve SL is turned on and off in response to an ON/OFF signal corresponding to a SL command signal $S_{SL}$ supplied by the ECU 80, so as to generate a switching signal pressure $P_{SL}$. The lock-up relay valve 102 switches the lock-up clutch 34 to a released state, an engaged state, or a slip state. The slip control linear solenoid valve SLU outputs a signal pressure $P_{SLU}$ according to a drive current $I_{SLU}$ that corresponds to a lock-up clutch pressure command value (i.e., a LU clutch pressure command value or a SLU command pressure) supplied by the ECU 80. The lock-up control valve 104 controls the slip amount $N_S$ of the lock-up clutch 34 and engages the lock-up clutch 34 according to the signal pressure $P_{SLU}$ when the lock-up clutch 34 is placed in an engaged or slip state by the lock-up relay valve 102. That is, the lock-up control valve 104 switches the operating state of the lock-up clutch 34 within a range from the slip state to the lock-up on state.

As shown in FIG. 4, the lock-up relay valve 102 includes a spool 106 for switching the connective state. This spool 106 is switched between a released position (i.e., an OFF position) that places the lock-up clutch 34 in the released state and an engaged position (i.e., an ON position) that places the lock-up clutch 34 in the engaged state or the slip state, according to the switching signal pressure $P_{SL}$. In FIG. 4, the side to the left of the center line shows a state in which the spool 106 is in the OFF position (OFF), in which the lock-up clutch 34 is in the released state, and the side to the right of the center line shows a state in which the spool 106 is in the ON position (ON), in which the lock-up clutch 34 is in the engaged state or the slip state.

Also, the lock-up control valve 104 includes a spool 108 for switching the connective state. This spool 108 is switched between a slip (SLIP) position and a completely engaged (ON) position. In FIG. 4, the side to the left of the center line shows a state in which the spool 108 is in the slip (SLIP) position, and the side to the right of the center line shows a state in which the spool 108 is in the completely engaged (ON) position.

Further, the slip control linear solenoid valve SLU outputs a signal pressure $P_{SLU}$ that controls the engaging pressure when engaging or slip engaging the lock-up clutch 34, according to a command from the ECU 80. For example, the slip control linear solenoid valve SLU is an electromagnetic control valve that, when modulator pressure $P_M$ that is regulated by the hydraulic control circuit 100 is the base pressure, reduces this pressure modulator pressure $P_M$ and outputs the resultant pressure as the signal pressure $P_{SLU}$. The slip control linear solenoid valve SLU generates a signal pressure $P_{SLU}$ that is proportionate to the drive current (i.e., the energizing current) $I_{SLU}$ corresponding to the LU clutch pressure command value $S_{SLU}$ supplied by the ECU 80.

Also, the switching solenoid valve SL outputs a predetermined switching signal pressure $P_{SL}$ according to the SL command signal (an ON/OFF signal) $S_{SL}$ from the ECU 80. For example, the switching solenoid valve SL is configured to move the spool 106 of the lock-up relay valve 102 to the ON position (ON), i.e., the engaged state, by applying the switching signal pressure $P_{SL}$ as drain pressure when de-energized (i.e., when off) and applying the switching signal pressure $P_{SL}$ as the modulator pressure $P_M$ when energized (i.e., when on), to a predetermined fluid chamber of the lock-up relay valve 102.

With the hydraulic control circuit 100 structured as described above, the supply state of hydraulic pressure to the engage-side fluid chamber 16 on and the release-side fluid chamber 16 off can be switched, such that the operating state of the lock-up clutch 34 is able to be switched. First, a case in which the lock-up clutch 34 is placed in the slip state or the lock-up on state will be described. In the lock-up relay valve 102, when the spool 106 is urged to the ON position by the switching solenoid valve SL, the second line pressure PL2 is supplied to the engage-side fluid chamber 16 on. This second line pressure PL2 that is supplied to the engage-side fluid chamber 16 on then becomes hydraulic pressure $P_{ON}$. Hydraulic pressure $P_{OFF}$ inside the release-side fluid chamber 16 off is simultaneously regulated by the lock-up control valve 104 (that is, the differential pressure $\Delta P$ (=$P_{ON}$–$P_{OFF}$), i.e., the engaging pressure, is regulated by the lock-up control valve 104), such that the operating state of the lock-up clutch 34 is switched within a range from the slip state to the lock-up on state.

More specifically, when the spool 106 of the lock-up relay valve 102 is urged to the engaged (ON) position, i.e., when the base 43 is switched to the engaged state or the slip state, and the spool 108 in the lock-up control valve 104 is in the slip (SLIP) position, the second line pressure PL2 is supplied to the release-side fluid chamber 16 off. The flowrate of the hydraulic fluid at this time is controlled by the signal pressure $P_{SLU}$. That is, when the spool 108 is in the slip (SLIP) position, the differential pressure $\Delta P$ is controlled by the signal pressure $P_{SLU}$ of the slip control linear solenoid valve SLU, such that the slip state of the lock-up clutch 34 is controlled. Also, when the spool 106 of the lock-up relay valve 102 is urged to the ON position and the spool 108 in the lock-up control valve 104 is urged to the completely engaged (ON) position, the second line pressure PL2 is not supplied to the release-side fluid chamber 16 off, but rather hydraulic fluid from the release-side fluid chamber 16 off is drained from a drain port EX of the lock-up control valve 104. As a result, the differential pressure $\Delta P$ is the maximum, and the lock-up clutch 34 is completely engaged.

On the other hand, in the lock-up relay valve 102, when the switching signal pressure $P_{SL}$ is not supplied and the spool 106 is in the OFF position, the second line pressure PL2 is supplied to the release-side fluid chamber 16 off. Then, the hydraulic fluid drained through the engage-side fluid chamber 16 on is supplied to an oil cooler via the lock-up relay valve 102 and cooled. That is, when the spool 106 of the lock-up relay valve 102 is moved to the OFF position, the lock-up clutch 34 is placed in the released state, and slip or engagement control via the slip control linear solenoid valve SLU or the lock-up control valve 104 is not performed. In other words, even if the signal pressure $P_{SLU}$ output from the slip control linear solenoid valve SLU is changed, this change will not be reflected in the engagement state (i.e., the differential pressure $\Delta P$) of the lock-up clutch 34 as long as the spool 106 of the lock-up relay valve 102 is in the OFF position.

The differential pressure $\Delta P$ that is controlled by the signal pressure $P_{SLU}$ of the slip control linear solenoid valve SLU is a pressure value indicative of an engaged state or a released state of the lock-up clutch 34. In this example embodiment, the differential pressure $\Delta P$ is a lock-up clutch pressure $P_{LU}$. Also, this lock-up clutch pressure $P_{LU}$ is also a pressure value corresponding to the slip amount $N_S$ and the torque capacity (i.e., the lock-up clutch torque) $T_{LU}$ of the lock-up clutch 34. Moreover, the LU clutch pressure command value $S_{SLU}$ and the signal pressure $P_{SLU}$ of the slip control linear solenoid valve SLU are pressure command values of the lock-up clutch pressure $P_{LU}$.

Figure 5:
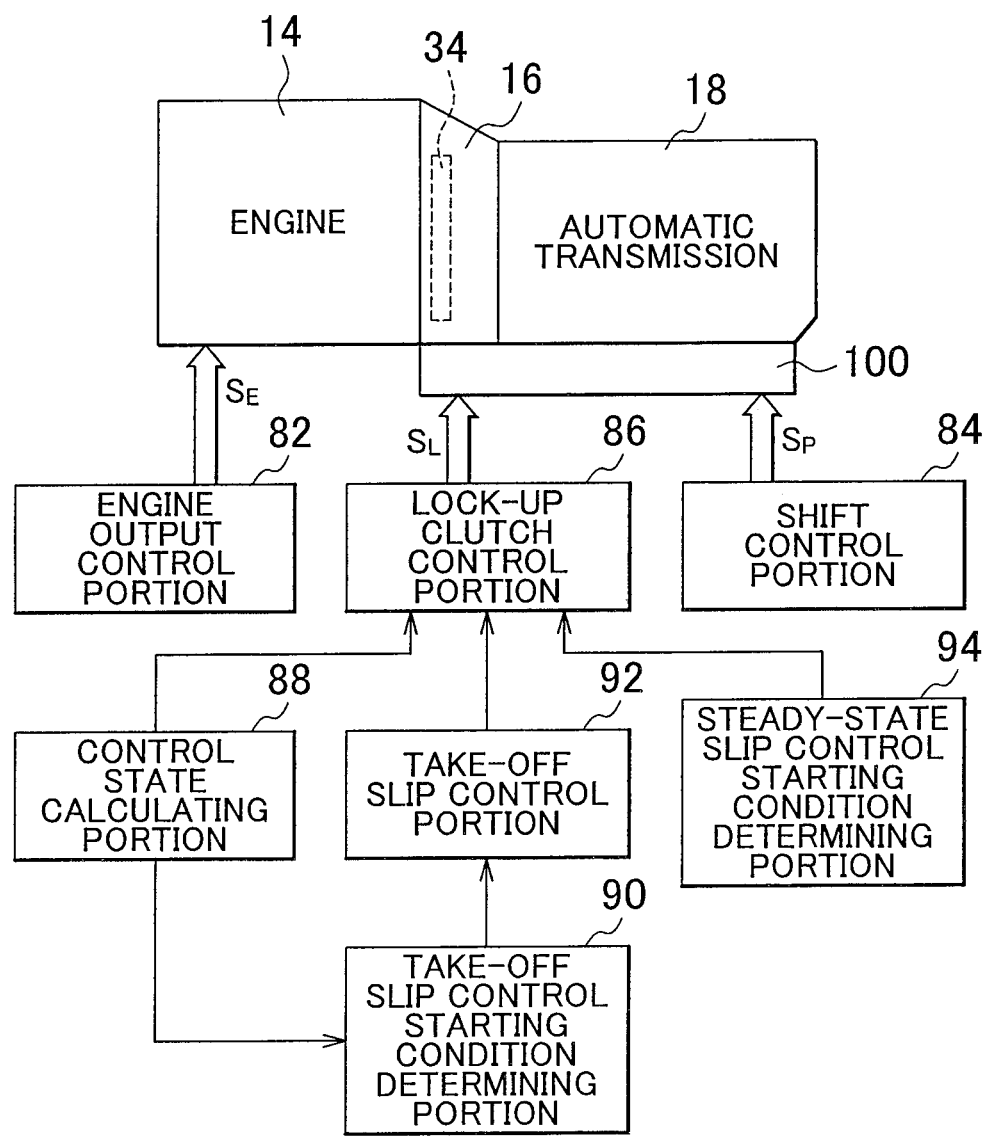
FIG. 5 is a functional block line diagram of the main control functions of an electronic control unit of the automatic transmission to which the control apparatus of the invention is applied.

FIG. 5 is a functional block line diagram of the main control functions of the ECU 80. In FIG. 5, an engine output control portion 82 outputs engine output control command signals $S_E$ that control, for example, the fuel injection quantity from the fuel injection apparatus for fuel injection quantity control, and control an ignition device such as the igniter for ignition timing control, in addition to controlling the electronic throttle valve open and closed by the throttle actuator for throttle control. For example, the engine output control portion 82 controls the fuel injection quantity from the fuel injection apparatus and controls the ignition device such as the igniter, in addition to controlling the electronic throttle valve open and closed to obtain a throttle valve opening amount $\theta_{TH}$ whereby a target engine torque $T_E^*$ can be obtained based on the actual engine speed $N_E$ from a well-known relationship (i.e., an engine torque map), that is obtained through testing and stored in advance, between the engine speed $N_E$ and an estimated value $T_E'$ of the engine torque $T_E$ (hereinafter, referred to as the "estimated engine torque $T_E'$"), with engine loads such as the intake air amount $Q_{AIR}$ and the throttle valve opening amount $\theta_{TH}$ or the like as parameters. The target engine torque $T_E^*$ is obtained by the ECU 80, so as to become larger as the accelerator operation amount Acc increases, based on the accelerator operation amount Acc corresponding to the required acceleration amount, for example. This target engine torque $T_E^*$ corresponds to the driver required engine torque.

A shift control portion 84 makes a shift determination based on the vehicle state indicated by the actual vehicle speed V and the accelerator operation amount Acc from a well-known relationship (i.e., a shift map or a shift line graph) stored in advance that has upshift lines for determining upshifts and downshift lines for determining downshifts, with the vehicle speed V and the accelerator operation amount Acc, for example, as variables, and determines whether a shift should be executed in the automatic transmission 18. Also, the shift control portion 84 determines the gear speed into which the automatic transmission 18 should be shifted, and outputs a shift command to execute automatic shift control of the automatic transmission 18 to establish the determined gear speed. For example, the shift control portion 84 outputs to the hydraulic control circuit 100 a pressure control command signal (i.e., a shift output command value) $S_P$ that engages and/or releases hydraulic frictional engagement apparatuses related to the shift in the automatic transmission 18, to establish the gear speed according to the clutch and brake application chart shown in FIG. 3.

The pressure control command signal Sp is a torque command value for controlling the torque transfer capacity (i.e., the clutch torque) corresponding to the clutch pressure of the clutches C and the brakes B. That is, the pressure control command signal $S_P$ is a pressure command value for generating engaging pressure at which the necessary torque transfer capacity can be obtained. For example, a pressure command value at which hydraulic fluid is drained so that the torque transfer capacity necessary to release a release-side frictional engagement apparatus can be obtained is output as a torque command value for the release-side frictional engagement apparatus, while a pressure command value at which hydraulic fluid is supplied so that the torque transfer capacity necessary to engage an engage-side frictional engagement apparatus can be obtained is output as a torque command value for the engage-side frictional engagement apparatus. Also, when a shift is not being executed, i.e., when maintaining a gear speed of the automatic transmission 18, a pressure command value for generating engaging pressure capable of maintaining friction force that can withstand the transmission input torque $T_{IN}$ (i.e., that can ensure the torque transfer capacity) is output. The hydraulic control circuit 100 operates the linear solenoid valves SL1 to SL5 in the hydraulic control circuit 100 such that a shift in the automatic transmission 18 is executed or the current gear speed of the automatic transmission 18 is maintained, according to the pressure control command signal Sp from the shift control portion 84, and operates the hydraulic actuators of the hydraulic frictional engagement apparatuses that contribute to establishing that gear speed.

The transmission input torque $T_{IN}$ is, for example, the torque that is input to the automatic transmission 18 via the torque converter 16, i.e., transfer torque that is transmitted to the input side of the clutch C1. This transmission input torque $T_{IN}$ is calculated as torque ($=T_E' \times t$) obtained by multiplying an estimated engine torque $T_E'$ calculated based on the actual engine speed $N_E$ and the throttle valve opening amount $\theta_{TH}$ from a well-known engine torque map, by a torque ratio t ($=$turbine torque $T_T$/pump torque $T_P$) of the torque converter 16, for example. Also, the torque ratio t of the torque converter 16 is calculated based on an actual speed ratio e from a well-known relationship (i.e., a map or a predetermined operating characteristic diagram of the torque converter 16) obtained through testing and stored in advance, of a speed ratio e ($=$turbine rotation speed $N_T$/pump rotation speed $N_P$ (engine speed $N_E$)), and the torque ratio t, an efficiency η, and a capacity coefficient C, for example.

A lock-up clutch control portion 86 controls the switching of the operating state of the lock-up clutch 34 based on the vehicle state indicated by the actual vehicle speed V and the throttle valve opening amount $\theta_{TH}$, from a relationship (i.e., a map or lock-up region line graph) stored in advance that has a lock-up off region, a lock-up slip region, and a lock-up on region, with the vehicle speed V and the throttle valve opening amount $\theta_{TH}$ as variables, for example. For example, the lock-up clutch control portion 86 determines if the vehicle state is in the lock-up off region, the lock-up slip region, or the lock-up on region, based on the actual vehicle state from the lock-up region line graph, and outputs a lock-up control command signal $S_L$ for switching the lock-up clutch 34 to the lock-up off state or the lock-up slip state or the lock-up on state to the hydraulic control circuit 100. Also, when the lock-up clutch control portion 86 determines that the vehicle state is in the lock-up slip region, the lock-up clutch control portion 86 successively calculates the actual slip amount $N_S$ ($=N_E-N_T$) of the lock-up clutch 34, and outputs a lock-up control command signal $S_L$ for controlling the differential pressure ΔP such that the actual slip amount $N_S$ comes to match a target slip amount $N_S^*$ to the hydraulic control circuit 100. For example, in a relatively high vehicle speed range in a given gear speed, slipping loss (i.e., internal loss) of the torque converter 16 is eliminated, such that fuel efficiency is improved, by placing the lock-up clutch 34 in the lock-up on state and directly connecting (i.e., locking up) the pump impeller 16p with the turbine runner 16t. Also, in a relatively low to mid vehicle speed range in a given gear speed, the lock-up operating range is broadened to improve the transfer efficiency of the torque converter 16 and improve fuel efficiency, by executing slip control (i.e., lock-up slip control) that slip-engages the lock-up clutch 34 by providing a predetermined small amount of slip corresponding to a target slip amount $N_S^*$ of approximately 50 rpm to 100 rpm, for example, between the pump impeller 16p and the turbine runner 16t.

The hydraulic control circuit 100 switches the valve position of the lock-up relay valve 102 between the released (OFF) position and the engaged (ON) position by operating the switching solenoid valve SL such that the lock-up clutch 34 switches between the released state and the slip state or the completely engaged state according to the lock-up control command signal $S_L$ from the lock-up clutch control portion 86. Also, the hydraulic control circuit 100 engages the lock-up clutch 34 and controls the slip amount $N_S$ of the lock-up clutch 34 by operating the slip control linear solenoid valve SLU such that the lock-up clutch torque $T_{LU}$ when the lock-up clutch 34 is in the slip state or the completely engaged state is increased or decreased via the lock-up control valve 104, according to the lock-up control command signal $S_L$ from the lock-up clutch control portion 86.

Also, the lock-up clutch control portion 86 executes take-off lock-up slip control (i.e., take-off slip control) that slip-engages the lock-up clutch 34 such that the engine speed $N_E$ comes to match a target value, when the vehicle takes off from a standstill following an accelerator-on operation (i.e., as the accelerator pedal 56 is depressed), for example. With this take-off slip control, for example, when a predetermined take-off slip control starting condition set in advance is satisfied, fuel consumption is suppressed by suppressing the engine speed $N_E$ from racing (i.e., overspeeding) above a target engine speed $N_E^*$ that is set in advance for achieving both fuel efficiency and power performance according to the accelerator operation amount Acc as the required acceleration amount for the vehicle 10. When the vehicle is in a state in which this kind of take-off slip control is executed, immediately after an accelerator-on operation (i.e., immediately after the accelerator pedal 56 is depressed) (such as immediately after the vehicle takes off from a standstill) while the lock-up clutch 34 is in a released state, it is difficult to control the slip amount $N_S$ ($=N_E-N_T$) because it is a transitional period in which the engine speed $N_E$ is increasing. Therefore, in this take-off slip control, open loop control (i.e., open control or feed-forward control) that sets a constant LU clutch pressure command value $S_{SLU}$ based on the accelerator operation amount Acc is executed to suppress the engine speed $N_E$ from racing above the target engine speed $N_E^*$, for example. Also, if it is determined that the vehicle state is in the lock-up slip region, slip control that slip-engages the lock-up clutch 34 is executed so that the slip amount $N_S$ comes to match the target value, as described above (slip control by this feedback control will be referred to as steady-state lock-up slip control (i.e., steady-state slip control)). In this steady-state slip control, feedback control by a closed loop that successively sets the LU clutch pressure command value $S_{SLU}$ based on a difference $\Delta N_S$ ($=N_S^*-N_S$) between the actual value of the slip amount $N_S$ (i.e., the actual slip amount $N_S$) and a target value (i.e., a target slip amount $N_S^*$), for example, is executed.

The take-off slip control described above is control that slip-engages the lock-up clutch 34 toward engaging, to inhibit the engine speed $N_E$ from temporarily increasing above the target engine speed $N_E^*$ following an accelerator-on operation when the vehicle takes off with the accelerator on (i.e., depressed). Therefore, take-off slip control is preferably executed when the vehicle takes off with the accelerator on with the accelerator operation amount Acc being a relatively small operation amount, for example, in order to minimize an odd sensation or the like felt by the driver, in terms of the feeling of vehicle acceleration or the like with respect to how the accelerator pedal 56 is being depressed. Therefore, in the lock-up region line graph used to determine whether the vehicle state is in the take-off lock-up slip region, which is one of the predetermined take-off slip control starting conditions, the take-off lock-up slip region is set in the region in which the throttle valve opening amount $\theta_{TH}$ is a relatively small opening amount, for example. In this example embodiment, the lock-up slip region for determining execution of steady-state slip control will be referred to as the steady-state lock-up slip region in order to differentiate it from this take-off lock-up slip region. Also, the take-off lock-up slip region is, for example, a region set taking into account the improvement of fuel efficiency by suppressing the engine speed $N_E$ from racing, for example, and the steady-state lock-up slip region is a region that is set taking into account drivability and muffled sound (such as NVH (noise, vibration, and riding comfort) performance), for example. Also, in steady-state slip control, control that is executed when the vehicle is accelerating with the accelerator on may be referred to as "acceleration slip control", and control that is executed when the vehicle is decelerating with the accelerator off may be referred to as "deceleration slip control" so that they, can be distinguished from one another.

Further, if a predetermined steady-state slip control starting condition is satisfied while take-off slip control is being executed, for example, control may be shifted from take-off slip control to steady-state slip control. Take-off slip control and steady-state slip control are both slip controls, but they may also be viewed as separate controls because the way in which the LU clutch pressure command value $S_{SLU}$ is set is entirely different.

Figure 6:
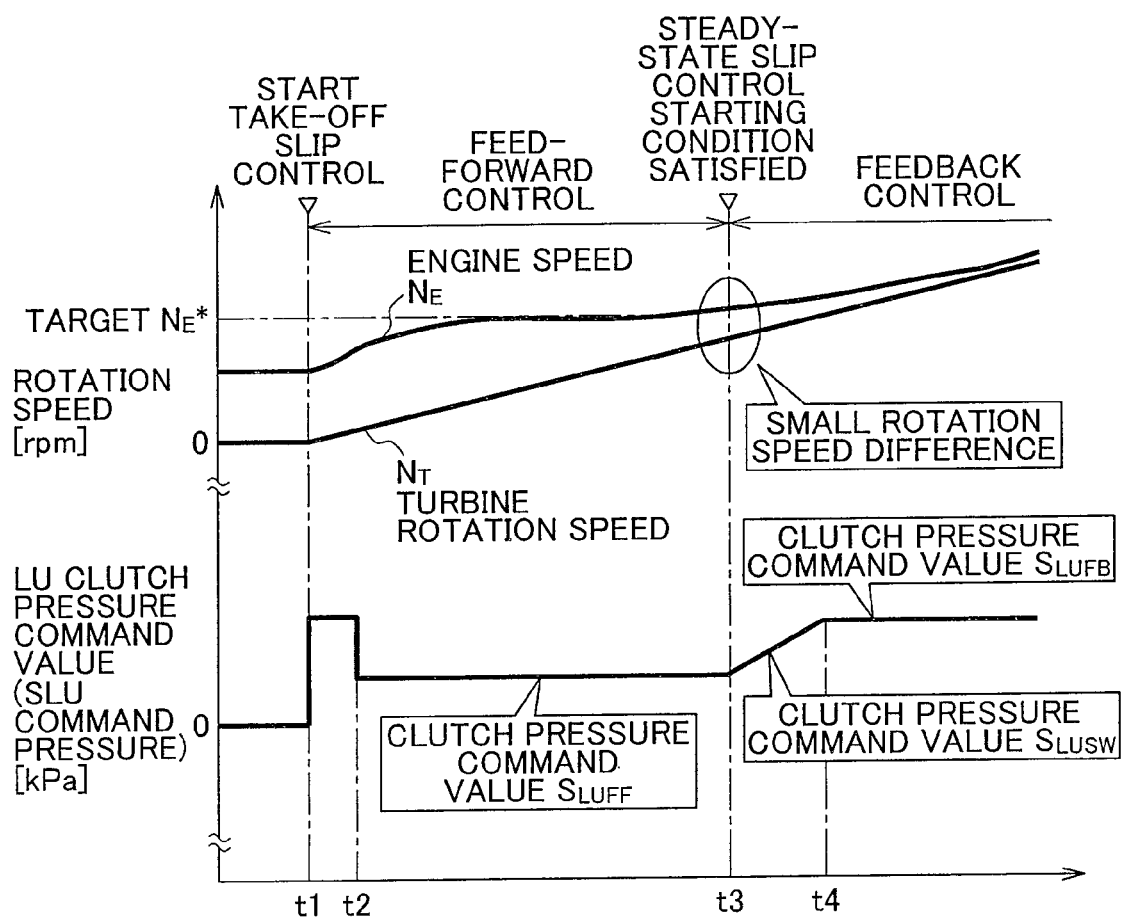
FIG. 6 is a chart showing one example of a LU clutch pressure command value set when executing take-off slip control and steady-state slip control of the automatic transmission to which the control apparatus of the invention is applied.

FIG. 6 is a chart showing one example of the LU clutch pressure command value $S_{SLU}$ set when executing take-off slip control and steady-state slip control. In FIG. 6, as the LU clutch pressure command value $S_{SLU}$ in take-off slip control, a clutch pressure command value for fast filling (rapid filling) first starts to be output (time t1), and is then maintained at a constant clutch pressure command value $S_{LUFF}$ in feed-forward control in order to inhibit the engine speed $N_E$ from racing above the target engine speed $N_E^*$ and maintain (bring) the engine speed $N_E$ at (to) the target engine speed $N_E^*$ (time t2 to time t3). Then when the predetermined steady-state slip control starting condition is satisfied (time t3), a clutch pressure command value $S_{LUSW}$ that gradually increases from the clutch pressure command value $S_{LUFF}$ toward a clutch pressure command value $S_{LUFB}$ in the feedback control is output (time t3 to time t4), and the clutch pressure command value $S_{LUFF}$ in feedback control for bringing the actual slip amount $N_S$ to match the target slip amount $N_S^*$ is successively set (time t4 and thereafter).

The constant clutch pressure command value $S_{LUFF}$ in the feed-forward control is set according to the accelerator operation amount Acc and the throttle valve opening amount $\theta_{TH}$ and the like to inhibit the engine speed $N_E$ from racing above the target engine speed $N_E^*$, for example. That is, the engine torque $T_E$ becomes larger and racing of the engine 14 also increases as the accelerator operation amount Acc increases, i.e., as the throttle valve opening amount $\theta_{TH}$ increases. Therefore, from the viewpoint of making it easier to suppress the engine speed $N_E$ by increasing the lock-up clutch torque $T_{LU}$ progressively earlier as the accelerator operation amount Acc increases; the LU clutch pressure command value $S_{SLU}$ in take-off slip control is set such that the clutch pressure command value $S_{LUFF}$ becomes larger as the accelerator operation amount Acc increases, for example. Of course, various modes are possible. For example, the throttle valve opening amount $\theta_{TH}$, the intake air amount $Q_{AIR}$, the fuel injection quantity, or the estimated engine torque $T_E'$ calculated from the throttle valve opening amount $\theta_{TH}$ or the intake air amount $Q_{AIR}$ or the like, may be used instead of the accelerator operation amount Acc.

Here, as slip control is executed, the amount of cumulative heat during slip control that is generated in the friction elements of the lock-up clutch 34 (hereinafter, referred to as the "generated heat amount") Qs [cal/cm²] increases, and so too does the temperature of the friction elements themselves. Therefore, depending on how slip control is executed, the durability of the friction elements may decrease. In particular, take-off slip control is control from the time that the vehicle takes off, when the slip amount $N_S$ of the lock-up clutch 34 is comparatively larger than it is in steady-state control, so the heat resistance of the friction elements may become even more of an issue. In contrast, in this example embodiment, take-off slip control is executed with the generated heat amount Qs in one time of control having a predetermined maximum generated heat amount Qsmax as an upper limit. This predetermined maximum generated heat amount Qsmax is a control execution allowable upper limit value that is set in advance as a generated heat amount that does not exceed a friction element breakdown temperature that is an allowable upper limit temperature at which it is possible to avoid a significant decrease in the durability of the friction elements due to the temperature of the friction elements of the lock-up clutch 34, when take-off slip control is executed with the predetermined take-off slip control starting condition, for example.

Also, steady-state slip control is executed such that an instantaneous generated heat amount dq/dt [cal/cm²×s] when control is being executed falls below a predetermined maximum instantaneous generated heat amount dq/dtmax obtained through testing and set beforehand in order to at least prevent the temperature of the friction elements of the lock-up clutch 34 from rising, according to the correlation with the heat released. Therefore, even if, for example, the generated heat amount Qs exceeds the maximum generated heat amount Qsmax while take-off slip control is being executed, such that this take-off slip control is ended and steady-state slip control is executed following the take-off slip control, the temperature of the friction elements of the lock-up clutch 34 at least will not rise. In other words, if the generated heat amount Qs exceeds the maximum generated heat amount Qsmax while take-off slip control is being executed, switching to steady-state slip control ensures that the temperature of the friction elements of the lock-up clutch 34 at least will not rise, even if it is not able to be decreased.

From the viewpoint of improving fuel efficiency, it is desirable to execute take-off slip control as much as possible within a range where durability of the lock-up clutch 34 will not be lost. For example, when the vehicle is running in a way such that it repeatedly takes off and stops within a relatively short period of time, it is desirable to execute take-off slip control as much as possible, while ensuring the durability of the lock-up clutch 34. With the vehicle running in this way, if take-off slip control is continuously executed when the temperature of the friction elements of the lock-up clutch 34 has not sufficiently decreased, the temperature of the friction elements may end up exceeding the friction element breakdown temperature even if the maximum generated heat amount Qsmax is not exceeded during one time of take-off slip control.

In contrast, in this example embodiment, if the temperature of the friction elements does not exceed the friction element breakdown temperature even if the take-off slip control is continuously executed, take-off slip control is allowed the next time. At this time, whether or not the temperature of the friction elements will exceed the friction element breakdown temperature when take-off slip control is executed the next time changes depending on the generated heat amount Qs at the time of take-off slip control the last time. Also, even if the take-off slip control is unable to be repeatedly executed indefinitely, it may be able to be executed two consecutive times (i.e., take-off slip control the next time (i.e., the next take-off slip control) may be able to be executed once following take-off slip control the last time (i.e., the last take-off slip control)). That is, if the control mode is simply divided into a mode that allows take-off slip control to be repeatedly executed indefinitely, and a mode that prohibits take-off slip control the next time because it is unable to be repeatedly executed indefinitely, then even if the take-off slip control the next time is able to be executed consecutively only once, this take-off slip control may end up being prohibited, thus reducing the number of opportunities to execute take-off slip control.

Figure 7:
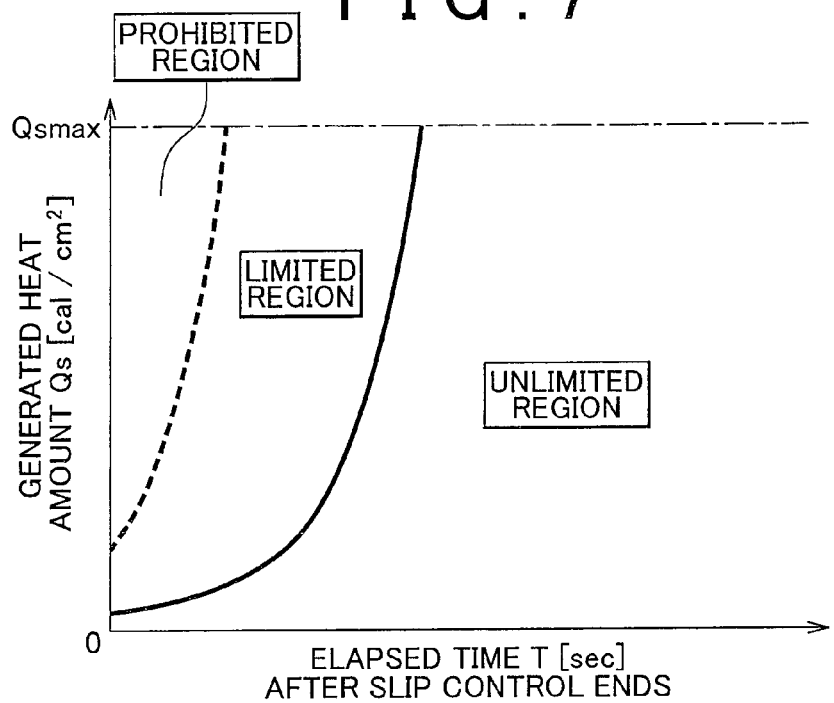
FIG. 7 is a graph showing an example of a slip control execution allowing map that has an unlimited region, a limited region, and a prohibited region, and has a generated heat amount during slip control of the automatic transmission to which the control apparatus of the example embodiment is applied and a time elapsed after slip control has ended as variables.

Therefore, in this example embodiment, as shown in FIG. 7, a predetermined relationship (a Qs-T map or a slip control execution allowing map) obtained through testing and set in advance is provided that has an unlimited region, a limited region, and a prohibited region, and has the generated heat amount Qs at the time of take-off slip control the last time and the elapsed time T [sec] after the lock-up slip control ends as variables. The unlimited region is an unlimited range where take-off slip control the next time is allowed to be repeatedly executed indefinitely. The limited region is a limited range where take-off slip control the next time is allowed to be repeatedly executed only a predetermined number of times such as once (i.e., one time following the last time, for a total of two consecutive times). The prohibited region is a prohibited range where take-off slip control the next time is prohibited. In FIG. 7, the Qs-T map is such that the prohibited region is set in a region where the generated heat amount Qs is large and the elapsed time T is short, with respect to the broken line. Also, the unlimited region is set in a region where the generated heat amount Qs is small and the elapsed time T is long, with respect to the solid line. The limited region is set in a region between the broken line and the solid line. Further, the region where the generated heat amount Qs exceeds the maximum generated heat amount Qsmax is a region where the take-off slip control is originally ended. That is, this Qs-T map is set such that as the generated heat amount Qs decreases, the limited region is obtained more easily than the prohibited region, and the unlimited region is obtained more easily than the limited region, and as the elapsed time T becomes longer, the limited region is obtained more easily than the prohibited region, and the unlimited region is obtained more easily than the limited region.

Allowing the take-off slip control the next time as described in this example embodiment refers to allowing take-off slip control until the maximum generated heat amount Qs for one time of take-off slip control is reached. Also, the generated heat amount Qs is the generated heat amount in only the take-off slip control, but the elapsed time T is the elapsed time after not only the take-off slip control, but also the lock-up slip control that includes the steady-state slip control executed continuously from the take-off slip control, ends for example. This is because although steady-state control at least does not increase the temperature of the friction elements of the lock-up clutch 34, as described above, it also does not reduce the temperature of the resistance elements like when the lock-up clutch 34 is placed in the lock-up off state (i.e., a torque converting state). Moreover, the lock-up slip control here may also include the lock-up on control that places the lock-up clutch 34 in the lock-up on state.

More specifically, returning to FIG. 5, a control state calculating portion 88 counts (i.e., measures) the elapsed time T after the lock-up slip control by the lock-up clutch control portion 86 ends. Also, the control state calculating portion 88 calculates the generated heat amount Qs during take-off slip control by the lock-up clutch control portion 86 according to Expression (1) below. Then the control state calculating portion 88 stores the generated heat amount Qs at the time that the take-off slip control by the lock-up clutch control portion 86 ends as the generated heat amount Qs during take-off slip control the last time. The stored value stored here is updated each time the take-off slip control is repeated, for example.

$$Qs = \text{instantaneous generated heat amount } dq/dt \times (\text{take-off slip control time}) \quad (1)$$

[where $dq/dt = (T_{LU} \times ((2\pi \times N_S)/60))/(\text{clutch area} \times 4.186)$]

A take-off slip control starting condition determining portion 90 determines whether a predetermined take-off slip control starting condition that has been set beforehand, for example, is satisfied. That is, the take-off slip control starting condition determining portion 90 is a take-off slip control execution determining portion that determines whether to start executing take-off slip control, by determining whether a predetermined take-off slip control starting condition is satisfied. This predetermined take-off slip control starting condition is satisfied when all of the following conditions, for example, are satisfied, that is, when i) the lever position $P_{SH}$ is in the "D" position, ii) the brake is off, i.e., a signal indicative of the brake being on $B_{ON}$ is not being input, iii) the hydraulic fluid temperature $TH_{OIL}$ is within a predetermined temperature range, such as a temperature range between a temperature when warm-up is complete and a temperature that is not determined to be a high fluid temperature, iv) the current gear speed is first speed and a shift is not being executed, v) the accelerator is on (i.e., depressed) after it has been determined that the vehicle 10 is stopped, and vi) the vehicle state is in the take-off lock-up slip region, i.e., the accelerator is on (i.e., being depressed) with the accelerator operation amount Acc being a predetermined small operation amount.

In addition, when it is determined that the predetermined take-off slip control starting condition is satisfied, the take-off slip control starting condition determining portion 90 determines which region, from among the prohibited region, the limited region, and the unlimited region, the slip control execution allowing region is in, based on the generated heat amount Qs during the take-off slip control the last time and the elapsed time T after the lock-up control ends, from the Qs-T map as shown in FIG. 7, for example. Furthermore, when it is determined that the slip control execution allowing region is in the limited region, the take-off slip control starting condition determining portion 90 determines whether take-off slip control the last time had been executed as a result of it being determined that the slip control execution allowed region is in this limited region.

When it is determined by the take-off slip control starting condition determining portion 90 that the predetermined take-off slip control starting condition is satisfied and the slip control execution allowed region is in the unlimited region, for example, a take-off slip control portion 92 outputs a take-off slip control command for executing take-off slip control that suppresses the engine speed $N_E$ when the vehicle takes off following an accelerator-on operation (i.e., as the accelerator is depressed) to the lock-up clutch control portion 86. Also, when it is determined by the take-off slip control starting condition determining portion 90 that the predetermined take-off slip control starting condition is satisfied, and the slip control execution allowed region is in the limited region, and take-off slip control the last time had not been executed as a result of it being determined that the slip control execution allowed region is in this limited region (i.e., take-off slip control the last time had been executed as a result of it being determined that the slip control execution allowed region is in the unlimited region), for example, the take-off slip control portion 92 outputs a take-off slip control command to the lock-up clutch control portion 86.

The lock-up clutch control portion 86 sets the target engine speed $N_E^*$ for obtaining both fuel efficiency and power performance according to the accelerator operation amount Acc, for example, in response to the take-off slip control command. Then the lock-up clutch control portion 86 executes feed-forward control that sets a constant clutch pressure command value $S_{LUFF}$ based on the accelerator operation amount Acc so as to inhibit the engine speed $N_E$ from racing above this target engine speed $N_E^*$, and outputs a slip-engage command to control the lock-up clutch pressure $P_{LU}$ of the lock-up clutch 34 according to this clutch pressure command value $S_{LUFF}$ to the hydraulic control circuit 100, so as to slip-engage the lock-up clutch 34. Also, the lock-up clutch control portion 86 ends the take-off slip control if the generated heat amount Qs during take-off slip control exceeds the maximum generated heat amount Qsmax, regardless of whether stead-state slip control or lock-up on control has started to be executed, while the take-off slip control is being executed.

On the other hand, when it is determined by the take-off slip control starting condition determining portion 90 that the predetermined take-off slip control starting condition is satisfied and the slip control execution allowed region is in the prohibited region, the take-off slip control portion 92 prohibits take-off slip control from being executed and does not output a take-off slip control command even though the take-off slip control starting condition is satisfied. Also, when it has been determined by the take-off slip control starting condition determining portion 90 that the predetermined take-off slip control starting condition is satisfied and the slip control execution allowed region is in the limited region, and take-off slip control the last time had been executed as a result of it being determined that the slip control execution allowed region is in the limited region, the take-off slip control portion 92 prohibits take-off slip control from being executed and does not output a take-off slip control command even though the take-off slip control starting condition is satisfied. Accordingly, the lock-up clutch control portion 86 does not execute take-off slip control as long as the take-off slip control command is not output, even when it has been determined by the take-off slip control starting condition determining portion 90 that the predetermined take-off slip control starting condition is satisfied, for example.

A steady-state slip control starting condition determining portion 94 determines whether the predetermined steady-state slip control starting condition that is set in advance, for example, is satisfied. That is, the steady-state slip control starting condition determining portion 94 is a steady-state slip control execution determining portion that determines whether to start executing steady-state slip control, by determining whether the predetermined steady-state slip control starting condition is satisfied. This predetermined steady-state slip control starting condition may be satisfied when the vehicle state is in a steady-state lock-up slip region of the lock-up region line graph, for example. Also, in particular, the predetermined steady-state slip control starting condition when switching from the take-off slip control may be satisfied when the generated heat amount Qs during take-off slip control exceeds the maximum generated heat amount Qsmax, or when the actual slip amount $N_S$ falls equal to or less than a predetermined slip amount $N_S'$ obtained through testing and set in advance for determining that slip control can be appropriately executed even if there is a switch from feed-forward control to feedback control in order to make the engine speed $N_E$ converge to some extent on the target engine speed $N_E^*$, for example.

The lock-up clutch control portion 86 executes steady-state slip control when the vehicle is running, when it is determined by the steady-state slip control starting condition determining portion 94 that the predetermined steady-state slip control starting condition is satisfied, for example. More particularly, if take-off slip control is being executed, for example, the lock-up clutch control portion 86 executes steady-state slip control following this take-off slip control.

Figure 8:
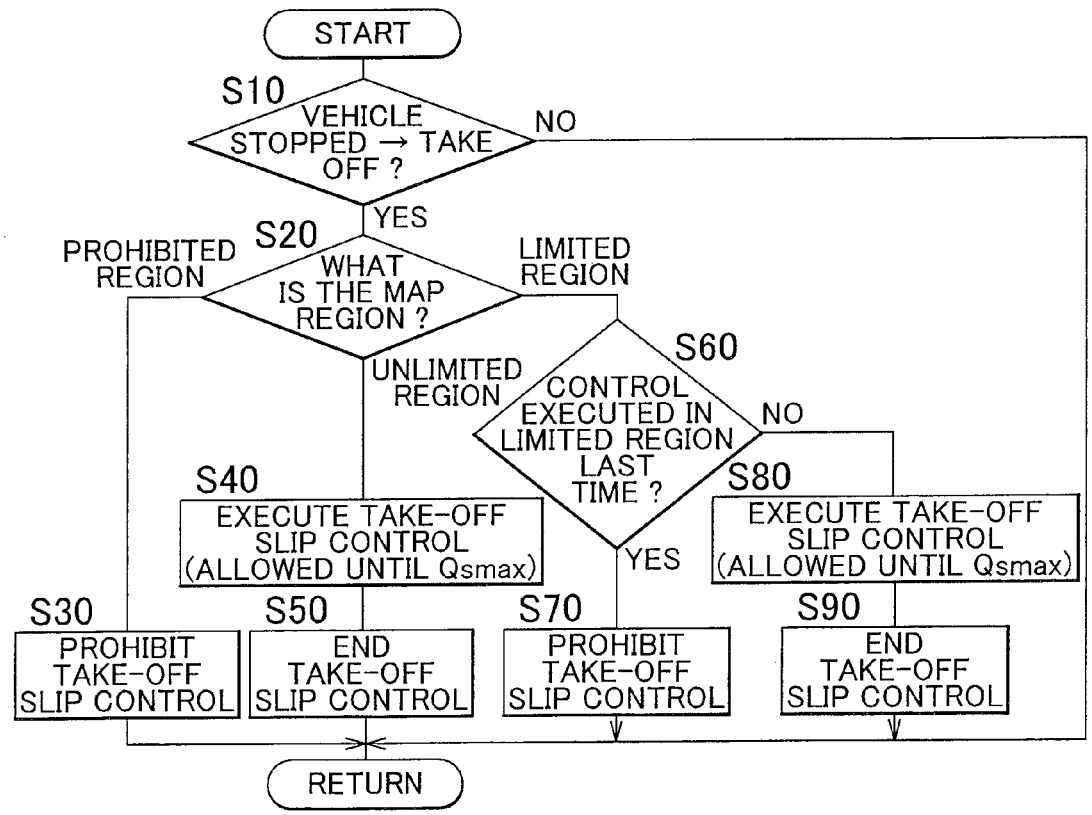
FIG. 8 is a flowchart illustrating a main control operation of the electronic control unit of the automatic transmission to which the control apparatus of the example embodiment is applied, i.e., a control operation for increasing, as much as possible, the number of opportunities to execute take-off slip control, while suppressing a decrease in the durability of the lock-up clutch.

FIG. 8 is a flowchart illustrating a main control operation of the ECU 80, i.e., a control operation for increasing the number of opportunities to execute take-off slip control as much as possible while suppressing a decrease in the durability of the lock-up clutch 34. The operation (i.e., the routine) is repeatedly executed in extremely short cycle times of several milliseconds to several tens of milliseconds, for example.

In FIG. 8, first, in step S10 that corresponds to the take-off slip control starting condition determining portion 90, it is determined whether the predetermined take-off slip control starting condition is satisfied, for example. If the determination in step S10 is no, then this cycle of the routine ends. However, if the determination in step S10 is yes, then in step S20 that corresponds to the take-off slip control starting condition determining portion 90, a determination as to which region, from among the prohibited region, the limited region, and the unlimited region, the slip control execution allowed region is in is made based on the generated heat amount Qs during the take-off slip control the last time and the elapsed time T after the lock-up slip control ends, from the Qs-T map as shown in FIG. 7, for example. If it is determined in step S20 that the slip control execution allowed region is in the prohibited region, then in step S30 that corresponds to the take-off slip control portion 92, execution of the take-off slip control is prohibited and a take-off slip control command is not output. On the other hand, if it is determined that the slip control execution allowed region is in the unlimited region, then in step S40 that corresponds to the take-off slip control portion 92 and the lock-up clutch control portion 86, a take-off slip control command is output and take-off slip control that suppresses the engine speed $N_E$ when the vehicle takes off following an accelerator-on operation (i.e., as the accelerator is depressed) is executed. Next, in step S50 that corresponds to the lock-up clutch control portion 86, this take-off slip control is ended if the generated heat amount Qs exceeds the maximum generated heat amount Qsmax while the take-off slip control is being executed, for example. If the take-off slip control is ended in this way, steady-state slip control, for example, is executed following this take-off slip control. On the other hand, if it is determined in step S20 that the slip control execution allowed region is in the limited region, then in step S60 that corresponds to the take-off slip control starting condition determining portion 90, it is determined whether take-off slip control the last time had been executed as a result of it being determined that the slip control execution allowed region is in the limited region. If the determination in step S60 is yes, i.e., if it is determined that take-off slip control the last time had been executed as a result of it being determined that the slip control execution allowed region is in the limited region, then in step S70 that corresponds to the take-off slip control portion 92, execution of the take-off slip control is prohibited and a take-off slip control command is not output, just as in step S30 described above. On the other hand, if the determination in step S60 is no, i.e., if it is determined that take-off slip control the last time had been executed as a result of it being determined that the slip control execution allowed region is in the unlimited region, then in step S80 that corresponds to the take-off slip control portion 92 and the lock-up clutch control portion 86, a take-off slip control command is output and take-off slip control is executed, just as in step S40 described above. Next, in step S90 that corresponds to the lock-up clutch control portion 86, this take-off slip control is ended if the generated heat amount Qs exceeds the maximum generated heat amount Qsmax while the take-off slip control is being executed, for example, just as in step S50 described above.

As described above, according to this example embodiment, the Qs-T map (i.e., the slip control execution allowing map) as shown in FIG. 7 is provided that has an unlimited region where take-off slip control the next time is allowed to be repeatedly executed indefinitely, a limited region where take-off slip control the next time is allowed to be repeatedly executed only a predetermined number of times such as once (i.e., one time following the last time, for a total of two consecutive times), and a prohibited region where take-off slip control the next time is prohibited, and has the generated heat amount Qs of the lock-up clutch 34 at the time of take-off slip control and the elapsed time T [sec] after the lock-up slip control ends as variables. Therefore, by executing take-off slip control according to this Qs-T map, the region in which take-off slip control the next time had been prohibited because take-off slip control the next time is unable to be executed repeatedly indefinitely, but is able to be repeatedly executed once, is made the limited region, such that take-off slip control the next time is allowed to be repeatedly executed only once. Therefore, the number of opportunities to execute take-off slip control can be increased as much as possible while suppressing a decrease in the durability of the lock-up clutch 34, to combat the fact that repeated execution of take-off slip control may not be easily allowed due to the generated heat amount Qs becoming relatively large when take-off slip control is executed. Accordingly, fuel efficiency can be improved that much more.

Also, according to this example embodiment, take-off slip control is executed with the generated heat amount Qs of one time of control having the predetermined maximum generated heat amount Qsmax that is set in advance as the upper limit. Allowing take-off slip control the next time means allowing take-off slip control until the generated heat amount Qs reaches the predetermined maximum generated heat amount Qsmax for one time of control. Therefore, a decrease in the durability of the lock-up clutch 34 due to take-off slip control that has been allowed to be repeatedly executed actually being executed can be reliably suppressed.

Further, according to this example embodiment, a region from among the prohibited region, the limited region, and the unlimited region is obtained based on the generated heat amount Qs during take-off slip control and the elapsed time T after the lock-up slip control ends, from the Qs-T map, so take-off slip control can be appropriately executed according to this Qs-T map. Also, this Qs-T map is set such that as the generated heat amount Qs decreases, the limited region is obtained more easily, than the prohibited region, and the unlimited region is obtained more easily than the limited region, and as the elapsed time becomes longer, the limited region is obtained more easily than the prohibited region, and the unlimited region is obtained more easily than the limited region. As a result, take-off slip control can be executed even more appropriately according to this Qs-T map.

Heretofore, example embodiments of the invention are described in detail with reference to the drawings, but the invention may also be applied in other modes as well.

For example, in the example embodiment described above, the limited region of the Qs-T map as shown in FIG. 7 is a region where take-off slip control the next time is allowed to be repeatedly executed only once, but the invention is not limited to this. For example, the limited region may also be a region where take-off slip control the next time is allowed to be repeatedly executed only for a predetermined number of times that is two (i.e., three consecutive times) or more times. Also, in this limited region, there may also be a plurality of regions, such as a region where take-off slip control the next time is allowed to be repeatedly executed only once, and a region where take-off slip control the next time is allowed to be repeatedly executed only twice. If there is a region where take-off slip control the next time is allowed to be repeatedly executed only a predetermined number of times that is two or more times, then in the flowchart in FIG. 8, for example, the number of times that take-off slip control in the limited region has been executed consecutively may be determined by counting up an execution flag when the take-off slip control is executed in the limited region, and resetting the execution flag when the take-off slip control is executed in the unlimited region, and a determination to allow or prohibit the execution of take-off slip control may be made.

Also, in the example embodiment described above, the variables of the Qs-T map as shown in FIG. 7 are the generated heat amount Qs during take-off slip control the last time and the elapsed time T after lock-up slip control ends, but the variables may also be the generated heat amount Qs and an elapsed time T' after take-off slip control ends. In this case, it is thought that the manner in which the temperature of the friction elements of the lock-up clutch 34 decreases will differ depending on whether acceleration slip control or deceleration slip control is executed following take-off slip control, and the difference in the instantaneous generated heat amount dq/dt and the control time when the control is executed, and the like. It is therefore preferable to have different Qs-T' maps according to the manner in which stead-state slip control is executed following take-off slip control.

Also, with the example embodiment described above, the predetermined relationship having the unlimited range, the limited range, and the prohibited range, and having the generated heat amount and the elapsed time as the variables, is the Qs-T map, but the invention is not limited to this. For example, the predetermined relationship may also be a relational expression or the like having an unlimited range, a limited range, and a prohibited range, and having the generated heat amount and the elapsed time as variables, for example. That is, the predetermined relationship may also be a relational expression or the like that establishes an unlimited range, a limited range, and a prohibited range, and has the generated heat amount and the elapsed time as variables, for example. Further, in the example embodiment described above, the invention is applied to take-off slip control, but the invention may also be applied to steady-state slip control. Accordingly, the number of opportunities to execute lock-up slip control is able to be increased as much as possible while suppressing a decrease in the durability of the lock-up clutch 34. Thus, fuel efficiency is able to be improved that much more.

Also, in the example embodiment described above, the lock-up clutch 34 is given as an example of a friction clutch, but the invention is not limited to this. For example, the friction clutch may also be the clutches C or the brakes B of the automatic transmission 18. As slip control in this case, neutral control that is executed to reduce the idling load of the engine 14 while the vehicle is stopped, for example, is possible. This neutral control is control that places the power transmitting path in the automatic transmission 18 in a power transmission inhibited state (i.e., in a power transmission interrupted state or a state substantially similar to a power transmission interrupted state) by placing the clutch C1 that is a take-off clutch in a predetermined slip state, when a predetermined neutral control condition that is set beforehand, such as the vehicle 10 being stopped, the accelerator pedal 56 not being depressed, and the foot brake pedal 70 being depressed, and the like, is satisfied. The invention may also be applied to this kind of neutral control. Accordingly, the number of speeds and the internal structure of the automatic transmission is not limited to those of the automatic transmission 18 described above. The invention may also be applied to a vehicle not provided with the lock-up clutch 34, and thus the torque converter 16 (i.e., a fluid power transmitting device). For example, the invention may also be applied to a vehicle provided with a continuously variable transmission or a so-called DCT (Dual Clutch Transmission) or the like. In other words, the invention may be applied to any vehicle that is provided with a friction clutch (i.e., a friction clutch having a mechanism that allows friction elements to slip such that rotational difference occurs) in a power transmitting path between an engine and driving wheels, and that is capable of slip-engaging this friction clutch.

Also, in the example embodiment described above, the torque converter 16 provided with the lock-up clutch 34 is used as a fluid power transmitting device, but a fluid coupling without a torque multiplying effect may also be used.

The descriptions above are no more than example embodiments. That is, the invention may be carried out in modes that have been modified or improved in any of a variety of ways based on the knowledge of one skilled in the art.

The invention claimed is:

1. A control apparatus for a vehicular power transmitting apparatus, the vehicular power transmitting apparatus being provided with a friction clutch in a power transmitting path between an engine and a driving wheel, the control apparatus comprising:
a controller configured to control a slip-engagement of the friction clutch:
in the slip-engagement, a predetermined relationship being provided that has an unlimited range, a limited range and a prohibited range,
in the unlimited range, the slip engagement a next time being repeatedly started indefinitely,
in the limited range, the slip-engagement the next time being repeatedly started only a predetermined number of times,
in the prohibited range, the slip-engagement the next time being prohibited,
a generated heat amount in the friction clutch during the slip-engagement and an elapsed time after the slip-engagement ends being set as variables used in determining the predetermined relationship, and in advance the predetermined relationship being obtained by an experiment.

2. The control apparatus according to claim 1, wherein a map is provided in which the unlimited range, the limited range, and the prohibited range are indicated, with the generated heat amount in the friction clutch during the slip-engagement and the elapsed time after the slip-engagement ends as variables.

3. The control apparatus according to claim 1, wherein an expression is provided in which the unlimited range, the limited range, and the prohibited range are indicated, with the generated heat amount in the friction clutch during the slip-engagement and the elapsed time after the slip-engagement ends as variables.

4. The control apparatus according to claim 1, wherein the slip-engagement is executed with the generated heat amount in one time of control having a predetermined maximum generated heat amount that is set in advance as an upper limit; and allowing the slip-engagement the next time is allowing the slip-engagement until the predetermined maximum generated heat amount for one time of control is reached.

5. The control apparatus according to claim 1, wherein a range from among the prohibited range, the limited range, and the unlimited range is obtained based on the generated heat amount during the slip-engagement and the elapsed time after the slip-engagement ends, from the predetermined relationship.

6. The control apparatus according to claim 1, wherein the predetermined relationship is set such that as the generated heat amount during the slip-engagement decreases, the limited range is obtained more easily than the prohibited range and the unlimited range is obtained more easily than the limited range, and as the elapsed time after the slip-engagement ends becomes longer, the limited range is obtained more easily than the prohibited range and the unlimited range is obtained more easily than the limited range.

7. The control apparatus according to claim 1, wherein the friction clutch is a lock-up clutch capable of directly connecting together input/output rotating members of a fluid power transmitting device that transmits power of the engine to the driving wheel side; and the slip-engagement is a lock-up slip-engagement that slip-engages the lock-up clutch when a vehicle is running.

8. The control apparatus according to claim 7, wherein the lock-up slip-engagement is a take-off lock-up slip-engagement that slip-engages the lock-up clutch such that a speed of the engine comes to match a target value when the vehicle takes off.

* * * * *